United States Patent [19]

Albers et al.

[11] 4,433,213

[45] Feb. 21, 1984

[54] SUBSCRIBER'S LINE CIRCUIT FOR TELECOMMUNICATIONS NETWORKS

[75] Inventors: Raymund Albers, Eckental; Hans G. Widder, Nuremberg, both of Fed. Rep. of Germany

[73] Assignee: Te Ka De Felten & Guilleaume Fernmeldeanlagen GmbH, Nuremberg, Fed. Rep. of Germany

[21] Appl. No.: 344,779

[22] Filed: Feb. 1, 1982

[30] Foreign Application Priority Data

Feb. 6, 1981 [DE] Fed. Rep. of Germany ....... 3104138

[51] Int. Cl.³ ...................... H04M 1/76; H04M 19/00
[52] U.S. Cl. ............... 179/18 FA; 179/16 F
[58] Field of Search .............. 179/16 F, 18 FA, 16 A, 179/170 D

[56] References Cited

U.S. PATENT DOCUMENTS 3,916,110 10/1975 Lee et al. .................. 179/16 F
4,087,647 5/1978 Embree et al. .................. 179/77

Primary Examiner—Thomas W. Brown
Attorney, Agent, or Firm—Michael J. Striker

[57] ABSTRACT

A subscriber's line loop including a terminal station and symmetrically arranged in the loop relative to the station two constant current sources. Each current sources has a power unit defining an output connected to the terminal station, a feedback output, and a control input, a differential amplifier having a non-inverting input connected to a source of reference voltage. In order to suppress interference signals induced into the power unit, a bandpass filter is connected between the output of the differential amplifier and an adder connected to the inverting input of the amplifier. The other input of the adder is connected to the feedback output of the power unit. In a modification, a band rejection filter is interconnected between the control input of the power unit and the output of the differential amplifier.

8 Claims, 4 Drawing Figures

SUBSCRIBER'S LINE CIRCUIT FOR TELECOMMUNICATIONS NETWORKS

BACKGROUND OF THE INVENTION

The present invention relates in general to a subscriber's line circuit for a telecommunications network, particularly for a telephone network, and is of the type which includes at least one user's line loop connected to a user's terminal station, two sources of constant current arranged symmetrically to the terminal station in the user's line loop for keeping a constant current irrespective of the length of the line loop.

A line circuit of this kind is known for example from German published patent application No. 28 50 905. In this prior-art circuit, a source of constant current is applied both to the a-trunk line and to the b-trunk line of the user line circuit, in order to obtain symmetrical damping conditions of the voice-modulated alternating voltage, and thus to avoid crosstalk phenomena. Due to an inductive or capacitive coupling, relatively large hum voltages in the subscriber's line will occur, caused for example when overland lines or railroad lines extend parallel to the subscriber's line. As a consequence, the symmetrical arrangement of current sources for damping the voice-carrying voltages is no longer sufficient, especially when high standards for suppression of crosstalk are to be met, because the interference voltages cause an additional current to flow in unison with the frequency of the hum voltages, thus disturbing the symmetry of the alternating voice voltage. Since this known line circuit arrangement enables a simple monitoring of the operational conditions of the line loop, such as loop open, loop closed, ground key activated, it is desirable that the susceptibility of this monitoring function to interfering voltages be reduced, especially due to the fact that a disturbance signal is coupled into the line, the monitoring function can be impaired, for the damping of the crosstalk becomes ineffective.

SUMMARY OF THE INVENTION

It is therefore a general object of the present invention to overcome the aforementioned disadvantages.

More particularly, it is an object of the invention to provide an improved subscriber's line circuit of the aforedescribed kind which improves the resistance of the condition-detecting function of the line against interfering signals.

A further object of the invention is to provide such an improved line circuit in which the symmetry of the alternating voltage relative to the subscriber's station is increased.

In keeping with these objects and others which will become apparent hereafter, one feature of the invention resides, in a line circuit of the aforedescribed type, in the provision of two constant current sources arranged symmetrically to the terminal station in the user line loop, each of the current sources comprising a power unit having a power output connected to the terminal station, a regulating or feedback output which may contain the interference signal, and a control input, a differential amplifier having its output connected to the control input of the power unit, a non-inverting input and an inverting input, a source of reference voltage connected to the non-inverting input of the amplifier, and, in one embodiment, a bandpass filter connected to the control input of the power unit and via an input of an adder connected to an inverting input of a differential amplifier; the output of the differential amplifier is connected to the control input of the power unit, and the non-inverting input of the amplifier is connected to a source of reference voltage; the other input of the adder is connected to the feedback or regulating output of the power unit.

In another embodiment of this invention, the feedback output of the power unit is directly connected to the inverting input of the differential amplifier without the use of the adder, and a band rejection filter for the interference signals is connected between the control input of the power unit and the output of the differential amplifier.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
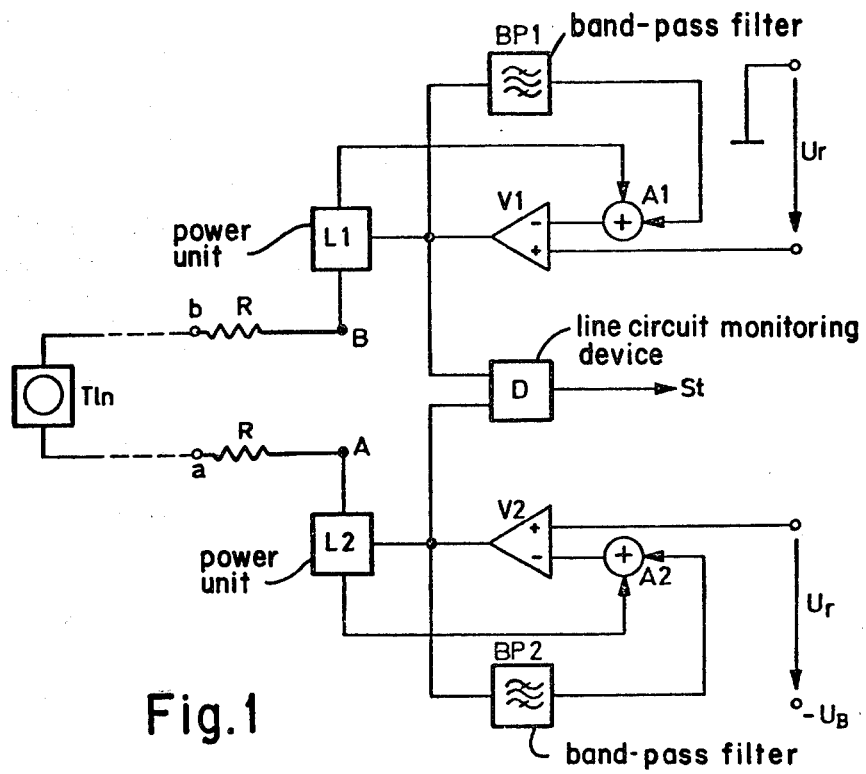
FIG. 1 is a block circuit diagram of a first embodiment of this invention.
Figure 2:
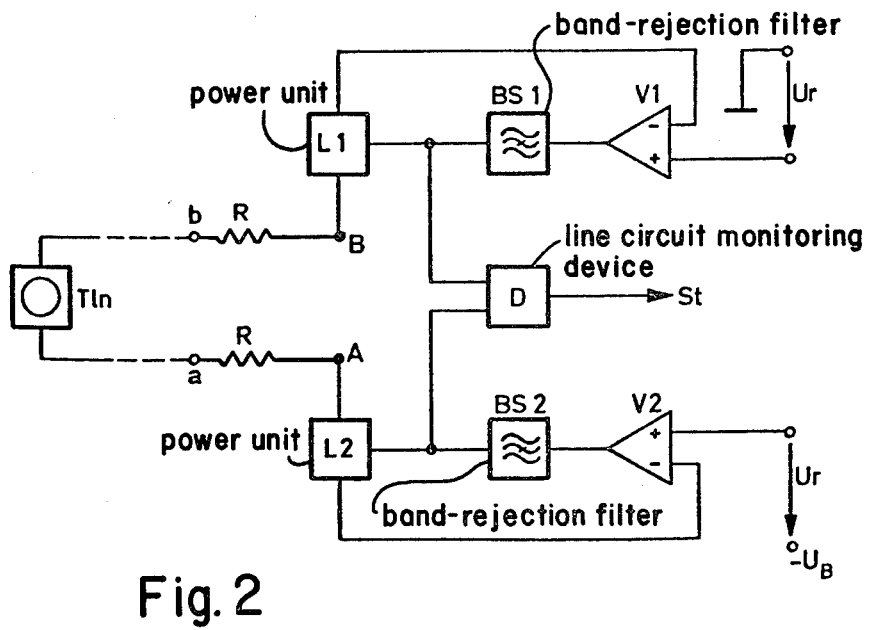
FIG. 2 is a block circuit diagram of a second embodiment.

Referring firstly to FIGS. 1 and 2, a subscriber's terminal station Tln is connected through symmetrically arranged a-trunk line and b-trunk line to the user line circuit of a telephone central station. Resistance of individual trunk lines which may differ according to the length of individual branches of the line loop, is indicated by resistors R. Connection terminals A and B of the user line circuit are each connected to a source of constant current. Each of the current sources includes a power unit L1 and L2 and a controlling differential amplifier V1 and V2. The power unit L2 is connected to the negative pole $-U_B$ of a DC power source, and the other power unit L1 is connected to the grounded positive pole of the DC power source. The non-inverting input (+) of differential amplifier V1 or V2 is connected to a source of reference voltage $U_r$. The reference voltage applied to the amplifier input is more negative or positive than the potential on corresponding poles of the DC battery voltage $U_B$.

In the embodiment according to FIG. 1, there is employed an adder A1 or A2 connected at its output to the non-inverting input of the amplifier V1 or V2. A regulating or feedback signal derived from respective power units L1 or L2, which may also contain a superimposed interference signal caused by coupled voltages from long-distance lines for example, is applied to the first input of the adder A1 or A2. The output of the differential amplifier V1 or V2 is connected via a bandpass filter BP1 or BP2 to the second input of adder A1 or A2 and is also connected to the control input of power unit L1 or L2. The bandwidth of each bandpass filter BP1 or BP2 is designed in dependence on particular applications, that is in dependence on frequency of predominant interference signals in a particular location. For example, in the case of overland power lines extending parallel to the subscriber's circuit loop, the frequency of coupled interference signals is for instance 50 cycles per second, whereas in the case of railroad lines the frequency is 16⅔ cycles per second. Accordingly, the bandpass filters BP1 and BP2 are dimensioned so as to pass through the frequency band between 16 and 50 cycles per second. Under other circumstances, it may also be of advantage to raise the upper limit frequency to pass through interference voltages of higher frequency, which may be generated during phase clipping control of trains. By virtue of the line circuit of this invention, the interference signals are neutralized at the output of differential amplifiers V1 and V2, and consequently a line circuit monitoring device D connected between the outputs of respective amplifiers V1 and V2 is practically undisturbed by the inteference signals. In addition, the symmetrical distribution of the alternating voltage of the entire line circuit is substantially improved.

A second embodiment of the line circuit of this invention is illustrated in FIG. 2. In this embodiment, the regulating or feedback signal derived from the power units L1 and L2 is applied directly to the inverting input of the differential amplifier V1 or V2. A band rejection filter BS1 or BS2 is interconnected between the control input of power units L1 and L2 and the output of respective amplifiers V1 and V2. Both band rejection filters are designed such that the frequency range of interference signals which may be present in the regulating or feedback signal from power units L1 and L2 is effectively stopped. The determination of the required frequency band to be rejected is made under the same considerations for designing the bandpass filters in the preceding example according to FIG. 1. The monitoring device D is connected between the control inputs of power units L1 and L2, where the interference signals no longer appear.

Figure 3:
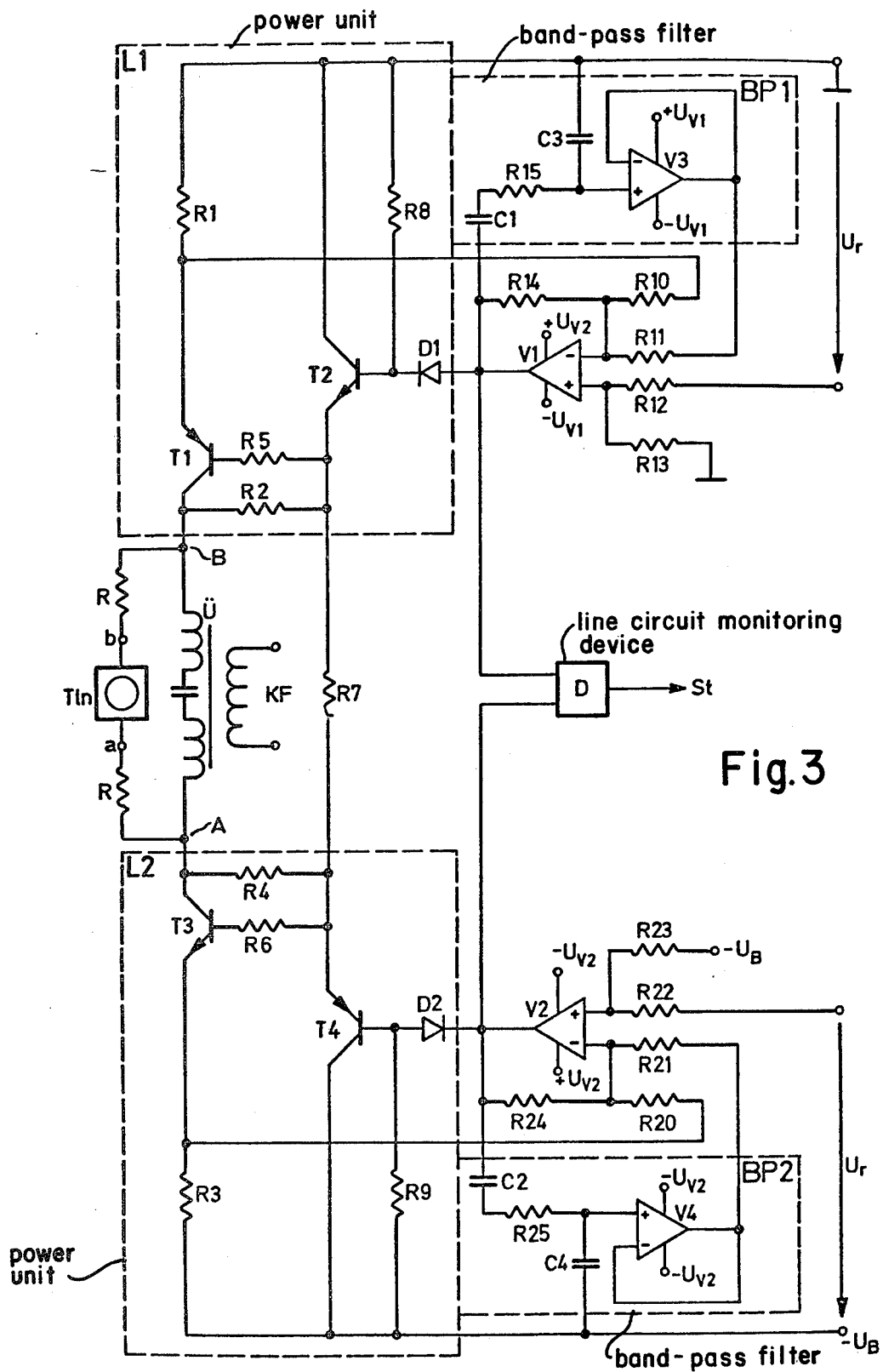
FIG. 3 is a more detailed example of the line circuit of FIG. 1.
Figure 4:
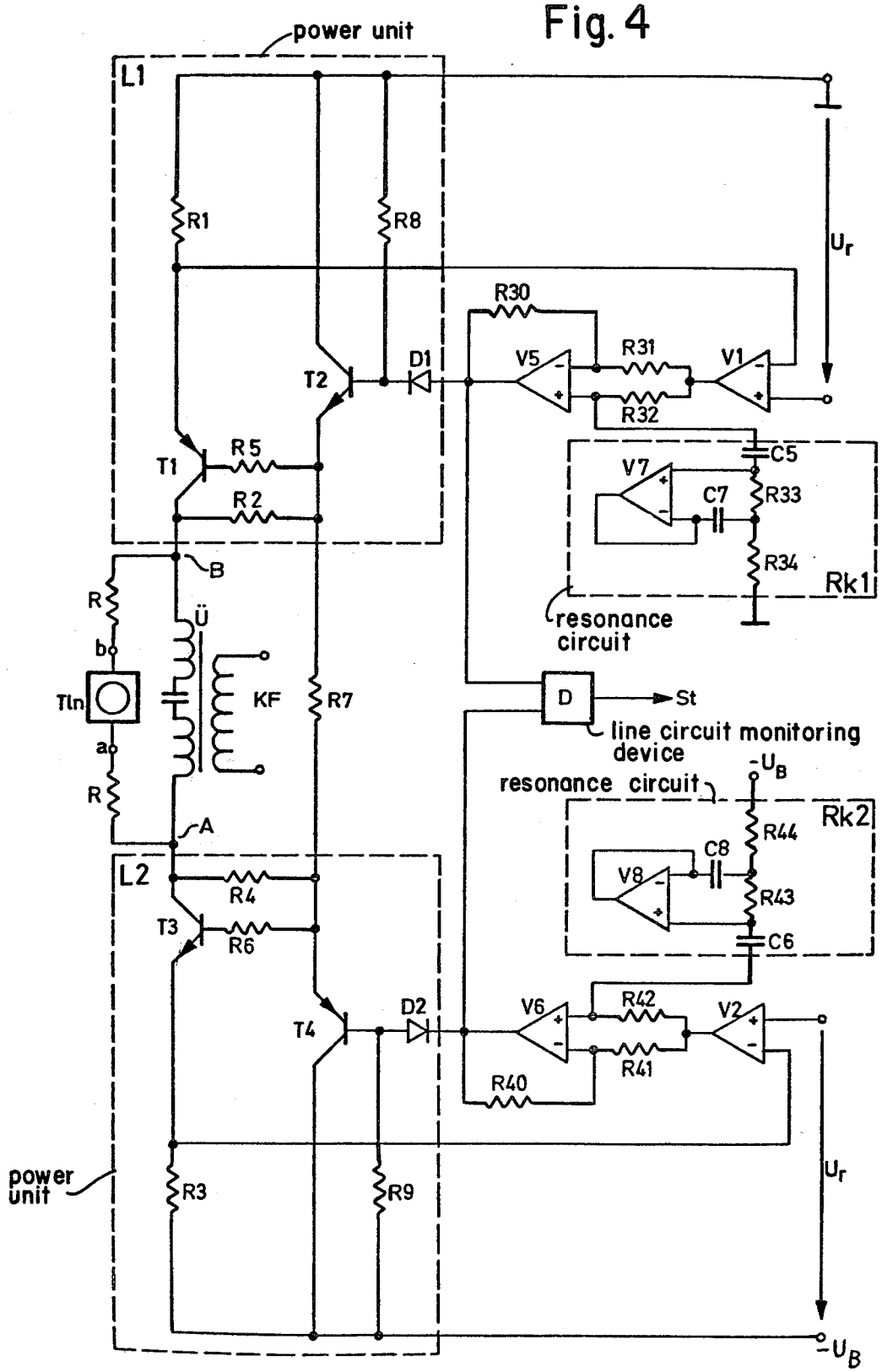
FIG. 4 is a detailed example of the line circuit of FIG. 2.

A detailed circuit diagram of the embodiment according to FIG. 1 is shown in FIG. 3, whereas FIG. 4 shows a detailed diagram of the embodiment of FIG. 2. In both cases, power units L1 and L2 of the constant current sources have the same construction, consisting of feeding transistors T1 or T3, the collectors of which are connected to respective connection points B or A of the user line loop b or a. The emitter of feed transistor T1 in power unit L1 is connected via resistor R1 to grounded positive pole of a power supply battery $U_B$, whereas the emitter of feed transistor T3 in power unit L2 is connected via resistor R3 to the negative pole of the battery $U_B$. Current delivered by the two feed transistors T1 or T3 depends on control signals applied to the base of each feed transistor via the collector-emitter path of transistors T2 and T4 having emitters interconnected through resistor R7 and collectors connected to the assigned poles of the power supply battery $U_B$. The emitter of transistor T2 is connected to the base of feed transistor T1 through resistor R5, and to the collector of transistor T1 through resistor R2. In the same fashion, the emitter of transistor T4 is connected to the base of transistor T3 through resistor R6, and to the collector of transistors T3 through resistor R4. The resistors R5 and R6 establish a required bias for the base of the corresponding feed transistor. The coupling resistor R7 has a relatively high ohmic value. The base of control transistor T2 is connected via resistor R8 to the positive pole of supply battery $U_B$ and further is connected through diode D1 to the output of an operational amplifier V1 connected as a differential amplifier. Similarly, the base of the other control transistor T4 in power unit L2 is connected through resistor R9 to the negative pole of the battery, and through an oppositely connected diode D2 to the output of the second operational amplifier V2, which is also connected as a differential amplifier. The interconnection of diodes D1 or D2 between the output of the amplifier and the control input of the assigned power unit L1 or L2 serves for limiting the collector-base current of the control transistors T2 or T4 when the user line loop is in open condition. A secondary winding of a coupling transformer U is connected between the connection points A and B of the subscriber's line loop a and b to apply voice-modulated carrier voltage into the latter. The secondary winding is constituted by two separate coils coupled by 2 series-connected capacitor for blocking direct current in the line loop. The primary winding of transformer U is connected to coupling means of the network of the central telephone station.

Bandpass filters BP1 and BP2 in the embodiment of FIG. 3 comprise capacitors C1, C3, resistor R15 and operational amplifier V3 or capacitors C2, C4, resistor R25 and operational amplifier V4. The group of resistors R10–R14 in connection with differential amplifier V1, or the group of resistors R20–R24 in connection with the other differential amplifier V2, act respectively as an analog adder. Resistors R10 and R20 in respective adders connect the inverting input of operational amplifiers V1 and V2 to feedback outputs of power units L1 and L2 at the emitters of feed transistors T1 and T3 and are connected via low-ohmic reference resistors R1 to the positive pole and through the resistor R3 to the negative pole of the supply battery $U_B$.

The output of operational amplifiers V3 and V4 in respective bandpass filters BP1 and BP2 are also connected via resistors R11 or R21 to the inverting input of the differential amplifiers V1 and V2. As a result, interference signals from the feedback output of the power units are added in opposite phase to the filtered part of the control signal, and consequently the interfering component of the control signal at the output of differential amplifiers V1 and V2 is eliminated. The resistance ratio R14/R10 or R24/R20 determines the amplification of the control signal together with the interference signal component and the resistance ratio R14/R11 or R24/R21 determines the amplification of about 180° phase-inverted signal component. If the amplification of the active elements V3 and V4 in the bandpass filters BP1 and BP2 is adjusted to one, and if the values of resistors R10–R13 and R20–R23 are the same, no interference signal occurs at the output of differential amplifier V1 or V2, and the monitoring or condition-detecting device D which is connected between the outputs of the differential amplifiers is not influenced by the interference signal.

Referring now to the function of the condition-detecting device D, it is necessary to refer briefly to the function of the feeding circuit of the latter.

The non-inverting input of the differential amplifiers V1 and V2 is connected to a source of reference voltage $U_r$. This reference voltage at the differential amplifier V1 is more negative by a certain value than the grounded positive pole of the supply battery, whereas the reference voltage $U_r$ at the non-inverting input of the other differential amplifier V2 is more positive by a certain value than the negative pole of the supply battery $U_B$. This value of the voltage difference $U_r$ depends on the magnitude of current flowing through the user line loop and on the magnitude of reference resistors R1 and R3. Differential amplifiers V1 and V2 are power-supplied by voltages $+U_{V1}$ and $-U_{V1}$ or $+U_{V2}$ and $-U_{V2}$. The reference potential for the supply voltage of the differential amplifier V1 is the grounded positive pole and for the supply voltage of amplifier V2 the negative pole of the supply battery $U_B$.

When the user line loop is open, no current flows therethrough, but the feed transistors T1 and T3 and the control transistors T2 and T4 are switched on. Through resistors R8, R7 and R9, the two control transistors T2 and T4 are biased in such a manner that the feed transistors T1 and T3 are in operative condition and are ready, upon closing of the user line loop, to immediately resume their function as the source of a constant current. Since voltage drop across resistors R1 and R3 is smaller than the corresponding reference voltage $U_r$, the differential amplifiers V1 and V2 are adjusted at their inputs to saturation, that is their outputs are at a potential which approaches their power-supply voltage. If the power-supply voltage of the differential transistors is set for example to $U_{V1}=15$ V relative to ground, and if $U_{V2}=15$ V relative to $-U_B$, the potential at the output of amplifier V1 approaches $-15$ V with respect to ground, and the potential at the output of amplifier V2 approaches $+15$ V relative to $-U_B$. In order to limit the collector-base current of control transistor T2 or T4, diodes D1 and D2 are connected between the outputs of differential amplifiers V1 and V2 and the bases of control transistors T2 and T4.

If the user line loop is closed, that is if after the lifting of the telephone receiver by the user, a current starts flowing through the user line loop. If for instance the feed transistor T1 delivers lower constant current than the other feed transistor T3, which case may occur due to structural tolerances in the circuit, the feed transistor T3 has a tendency to become saturated, that is the resistance of the collector-emitter path decreases and the potential at the collector electrode of T3 grows more negative. Consequently, through resistor R4 and the high-ohmic coupling resistor R7, as well as through user line loop branches a and b and the resistor R2, the potential on the emitter of control transistor T2 grows more negative and so does, via resistor R5, the base of control transistor T1. The control transistor T2 is thus activated to increase current in feed transistor T1. Due to the increased current through transistor T1, the voltage drop across resistor R1 is also increased so that the excitation of control transistor T2 via the differential amplifier V1 is still further increased until the feed transistor T1 achieves a stable working condition corresponding to the designed working point of its characteristic and the current flowing through the control transistor T2 and resistor R2 is adjusted to its full regulating magnitude at which the difference between the constant current of transistors T3 and T1 is neutralized. In opposite case, when feed transistor T1 delivers a higher constant current than the feed resistor T3, the above described equalizing process takes place in the control transistor T4 and in the resistor R4 in an analogous manner. When the subscriber's loop is closed, that is when both sources of constant current are operative, the two differential amplifiers V1 and V2 operate in the linear range, that is their output voltage varies in the range of the battery supply voltage $U_B$.

If upon activation of the grounding key the a-trunk line is applied to ground, the part of the power supply circuit in the b-trunk line is without current, and feeding current from transistor T3 flows through the a-trunk line. This means that the differential amplifier V1 operates in its linear range, and the differential amplifier V2 is at its saturated or fully excited condition.

In this manner, as the outputs of the two differential amplifiers V1 and V2 resume a quasi-digital state depending on the condition of their user line loop, it is possible by means of the simple condition-detecting device D having the form of a logic circuit for example to monitor the condition of the user line loop, such as loop is open, loop is closed, ground key is activated, and to transmit directly the detected condition to a central control station St. The detecting or monitoring logic circuit assigns for example a logic "o" to the outputs of differential amplifiers V1 and V2 when operating in linear range and a logic "1" when operating in saturated region. Since the aforementioned interfering and/or long-line voltages are coupled into the a- or b-trunk lines of the user line loop at the same phase, failures of the loop condition detecting function may result unless the arrangement of this invention is employed.

FIG. 4 illustrates an exemplary embodiment of a detailed circuit of the concept of FIG. 2. Power units L1 and L2 and the differential amplifiers V1 and V2, as well as the condition-detecting device D, are the same in structure and operation as in FIG. 3. In contrast, the suppression of interfering signals at the inputs of V1 and V2 differential amplifiers, operates as follows: The output signal from differential amplifier V1 or V2 is applied via resistors R31, R32 or R41 and R42 to both the inverting and non-inverting inputs of operational amplifiers V5 or V6. The output of the latter operational amplifiers V5 or V6 is fed back through resistors R30 or R40 to their inverting input. The non-inverting input of amplifier V5 or V6 is connected via active resonance circuits Rk1 or Rk2 both the ground and to the minus pole of supply battery $U_B$. These series resonance circuits are adjusted to pass through the frequency or frequency bands of the interference signals so that the latter are connected to ground potential. If the feedback resistors R30 or R40 are equal to resistors R31, R32 and R41, R42, the amplification of amplifiers V5 and V6 is equal to one, and no interference signals occur at the output of the latter amplifiers V5 and V6. Accordingly, the condition-detecting device D interconnected between these two outputs no longer is influenced by the interference signals and also the symmetry of the carrier alternating voltage in the subscriber's line circuit is increased.

In the embodiment shown, the resonance circuits Rk1 or Rk2 include respectively a capacitor C5 or C6 and a gyrator consisting of an operational amplifier V7 or V8, capacitors C7 or C8 and resistors R33, R34 or R43 and R44. If desired, there is always the possibility to connect more of such resonance circuits to the non-inverting inputs of amplifier V5 or V6, if for instance the frequency range of the band rejecting filters is to be increased. It will be understood that each of the elements described above, or two or more together, may also find a useful application in other types of constructions differing from the types described above.

While the invention has been illustrated and described as embodied in line circuits for use in telephone networks, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A line circuit for telecommunications networks, particularly for telephone networks, comprising at least one user line loop connected to a terminal station; two sources of constant current arranged symmetrically to the terminal station in the user line loop for keeping current in the loop constant irrespective of the length of the loop; each of said current sources comprising a power unit having a power output connected to the terminal station, a feedback output for delivering a regulating signal which may contain interference signal components, and a control input; a differential amplifier defining an output, a non-inverting input and an inverting input, the output of said differential amplifier being connected to the control input of the power unit; an adder having an output and two inputs, the output of said adder being connected to the inverting input of the amplifier, one of the inputs of the adder being connected to the feedback output of the power unit; a source of reference voltage connected to the non-inverting input of the amplifier; and a bandpass filter connected between said control input of the power unit and the other input of said adder to pass through the frequency band of interference signals at an opposite phase than the interference signal components from the feedback output of said power unit.

2. A line circuit for telecommunications networks, particularly for telephone networks, comprising at least one user line loop connected to a terminal station; two sources of constant current arranged symmetrically to the terminal station in the user line loop for keeping current constant irrespective of the length of the loop; each of said current sources comprising a power unit having a power output, a feedback output and a control input, said power output being connected to the terminal station; a differential amplifier defining an output, a non-inverting input and an inverting input; the feedback output of said power unit being connected to the inverting input of said differential amplifier for feeding thereto a regulating signal which may contain interference signal components; a source of reference voltage connected to the non-inverting input of the amplifier; and a band rejection filter connected between the control input of the power unit and the output of said differential amplifier to block the passage of said interference signal components of the regulating signal.

3. A line circuit as defined in claim 1, wherein each of said bandpass filters includes an active circuit element.

4. A line circuit as defined in claim 1, wherein said adder includes a plurality of resistors connected to the assigned differential amplifier to form therewith an adding amplifier whereby the ratio of values of respective resistors determines the amplification factor of the amplifier.

5. A line circuit as defined in claim 2, wherein each of the band rejection filters includes means for amplifying the output signal from the assigned differential amplifier, and at least one active resonant circuit connected between an input of the amplifying means and ground.

6. A line circuit as defined in claim 5, wherein the means for amplifying the output signal from the differential amplifier includes an operational amplifier having its amplification factor adjusted to one, and a resonance circuit connected to the non-inverting input of the operational amplifier.

7. A line circuir as defined in claim 1, further including condition-detecting means having two inputs connected between the outputs of the two differential amplifiers.

8. A line circuit as defined in claim 2, further including condition-detecting means having two inputs connected to said control inputs of respective power units.

* * * * *